US012715187B2

(12) United States Patent
Spring et al.

(10) Patent No.: US 12,715,187 B2
(45) Date of Patent: Aug. 25, 2026

(54) MANUFACTURING AN OPTICAL STRUCTURE

(71) Applicant: HEPTAGON PHOTONICS PTE. LTD., Singapore (SG)

(72) Inventors: Nicola Spring, Oberterzen (CH); Sebastiano Lazzi Gazzini, Zurich (CH)

(73) Assignee: HEPTAGON PHOTONICS PTE. LTD., Singapore (SG)

( * ) Notice: Subject to any disclaimer, the term of this patent is extended or adjusted under 35 U.S.C. 154(b) by 543 days.

(21) Appl. No.: 18/003,518

(22) PCT Filed: Jun. 24, 2021

(86) PCT No.: PCT/SG2021/050369
§ 371 (c)(1),
(2) Date: Dec. 28, 2022

(87) PCT Pub. No.: WO2022/005396
PCT Pub. Date: Jan. 6, 2022

(65) Prior Publication Data

US 2023/0241848 A1 Aug. 3, 2023

(30) Foreign Application Priority Data

Jun. 29, 2020 (GB) ..................................... 2009877

(51) Int. Cl.
*B29D 11/00* (2006.01)
*G02B 5/00* (2006.01)

(52) U.S. Cl.
CPC ........ *B29D 11/00307* (2013.01); *G02B 5/005* (2013.01)

(58) Field of Classification Search
CPC ........ B29D 11/00307; B29D 11/00432; G02B 5/005; G02B 7/02; G02B 9/02
See application file for complete search history.

(56) References Cited

U.S. PATENT DOCUMENTS 6,574,053 B1 * 6/2003 Spinali ................ G03F 7/70825 359/819
2008/0087636 A1 * 4/2008 Wu ...................... G03F 7/7035 216/65

(Continued)

FOREIGN PATENT DOCUMENTS

CN 115867868 A 3/2023
JP 5362003 B2 12/2013

(Continued)

OTHER PUBLICATIONS

International Search Report issued for the corresponding International Application No. PCT/SG2021/050369, dated Oct. 1, 2021, 2 pages (only for informational purposes).

(Continued)

*Primary Examiner* — Mariam Qureshi
(74) *Attorney, Agent, or Firm* — VIERING, JENTSCHURA & PARTNER mbB

(57) ABSTRACT

A method of manufacturing an optical structure may include providing a base structure that includes a substrate having an optical element extending from a first side of the substrate and dispensing liquid photoresist onto the base structure. The method may further include forming a layer of said liquid photoresist where the height of said layer is controlled by lowering the tool to a height above said substrate, and forming a spacer from the liquid photoresist by exposing a portion of the liquid photoresist to ultraviolet light. The spacer may include a central aperture above the optical element.

17 Claims, 6 Drawing Sheets

(56) References Cited

U.S. PATENT DOCUMENTS

| | | | | |
|---|---|---|---|---|
| 2010/0019339 | A1 | 1/2010 | Walberg et al. | |
| 2010/0328743 | A1* | 12/2010 | Wolterink | G02B 5/1814 359/566 |
| 2011/0037887 | A1* | 2/2011 | Lee | G02B 13/0035 348/340 |
| 2011/0292271 | A1 | 12/2011 | Lin et al. | |
| 2011/0292272 | A1* | 12/2011 | Terashima | G02B 7/102 348/E5.045 |
| 2012/0134028 | A1* | 5/2012 | Maruyama | H10F 39/8063 359/601 |
| 2016/0154199 | A1* | 6/2016 | Miyano | G02B 7/021 359/503 |
| 2017/0207374 | A1* | 7/2017 | Gubser | H10F 77/334 |
| 2023/0314660 | A1 | 10/2023 | Horvath et al. | |

FOREIGN PATENT DOCUMENTS

| | | | |
|---|---|---|---|
| KR | 20120057614 | A | 6/2012 |
| WO | 2015053706 | A1 | 4/2015 |
| WO | 2016028227 | A1 | 2/2016 |
| WO | 2017082820 | A1 | 5/2017 |

OTHER PUBLICATIONS

Chinese office action issued for the corresponding Chinese patent application No. 202180011015.6, dated Jun. 27, 2023, 14 pages (for informational purposes only).

* cited by examiner 306
308
318

306
308
318

306
308
318

MANUFACTURING AN OPTICAL STRUCTURE

CROSS-REFERENCE TO RELATED APPLICATIONS

The present application is a national stage entry according to 35 U.S.C. § 371 of PCT application No.: PCT/SG2021/050369 filed on Jun. 24, 2021; which claims priority to British patent application GB 2009877.8, filed on Jun. 29, 2020; all of which are incorporated herein by reference in their entirety and for all purposes.

TECHNICAL FIELD

This disclosure relates to manufacturing an optical structure.

BACKGROUND

Optical devices that include one or more optical light emitters and one or more optical sensors can be used in a wide range of applications including, for example, distance measurement, proximity sensing, gesture sensing, and imaging. Small optoelectronic modules such as imaging devices and light projectors employ optical assemblies that include lenses or other optical elements stacked along the device's optical axis to achieve desired optical performance. Replicated optical elements include transparent diffractive and/or refractive optical elements for influencing an optical beam. In some applications, such optoelectronic modules can be integrated into various consumer electronics, such as portable computing devices (e.g., smart phones, tablets, wearables, and laptop computers).

SUMMARY

The present disclosure relates to manufacturing an optical structure, such an optical structure can be stacked with other optical structures to form an optoelectronic module.

According to one aspect of the present disclosure there is provided a method of manufacturing an optical structure, the method comprising: providing a base structure, the base structure comprising a substrate having an optical element extending from a first side of the substrate, dispensing liquid photoresist onto the base structure; using a tool to form a layer of said liquid photoresist, wherein the height of said layer is controlled by lowering the tool to a height above said substrate; and forming a spacer from the liquid photoresist by exposing a portion of the liquid photoresist to ultraviolet light, wherein the spacer comprises a central aperture above the optical element.

Embodiments of the present disclosure advantageously enable more freedom to control the thickness (height) of the spacers by being able to control the dispensing of the liquid photoresist and the lowering of the tool. This ensures accurate control of the spacer height and avoids the costly and time consuming process of grinding down an "off-the-shelf" spacer that would otherwise be needed.

Furthermore, the manufacturing process is simplified compared to known methods because in embodiments of the present disclosure there is no need for a step of applying an adhesive layer that would otherwise be needed when an "off-the-shelf" spacer is adhered to an underlying substrate.

The spacer is formed during manufacture of the optical structure without incurring into mechanical interference between the optical element and the spacer (as would happen with, for example, a structured glass "off-the-shelf" spacer), this frees the designer from having to consider potential alignment tolerances between the spacer and the optical element when sizing the spacer's central aperture, provided that the optical function of the optical element is not impaired by such misalignment. Thus, when using the manufacturing process described herein, the size of the optical structure in the radial direction (width of the optical structure) is advantageously reduced. Consequently the size of the resulting final optoelectronic module can be reduced.

Furthermore, the spacer enables the definition of the numerical aperture of the optical system in which the optical structure is to be integrated. In particular, the selected liquid photoresist may be made from a material (e.g. an infrared blocking material) that is opaque to a wavelength range of interest of an optical beam that is to be incident on the optical element.

In some embodiments, the base structure comprises a yard surrounding the optical element, and the method comprises dispensing the liquid photoresist onto the yard. In these embodiments the spacer may be formed to cover the yard. The method may additionally comprise dispensing the liquid photoresist onto a portion of the optical element, and the spacer is formed to cover said portion of the optical element. Alternatively or additionally, the method may comprise dispensing the liquid photoresist onto the substrate, and wherein the spacer is formed to cover the substrate.

In some embodiments, no yard is present. In these embodiments, the method may comprise dispensing the liquid photoresist onto a portion of the optical element, and the spacer is formed to cover said portion of the optical element. Alternatively or additionally, the method may comprise dispensing the liquid photoresist onto the substrate, and the spacer is formed to cover the substrate.

When the optical structure is to be stacked with other optical structures to form an optoelectronic module. The reduced size of each of the optical structure in the radial direction results in a reduced radial size of the resulting optoelectronic module. This enables the consumer device in which the optoelectronic module is incorporated into to be made smaller.

The substrate may be a "wafer" and the manufacturing method of the embodiments described herein may comprise manufacturing multiple optical structures on such a wafer. The reduced size of each of the optical structures in the radial direction results in an increased population of optical structures on each wafer improving manufacturing efficiency.

The liquid photoresist may be a negative photoresist and forming said spacer may comprise: exposing ultraviolet light to only said portion of the liquid photoresist to harden the photoresist, wherein an area above the optical element is unexposed to ultraviolet light to form the central aperture; and removing remaining unexposed negative photoresist.

Alternatively, the liquid photoresist is a positive photoresist and forming said spacer comprises exposing ultraviolet light to at least an area over said optical element to define the central aperture of the spacer.

In some embodiments, the tool has a flat lower surface which contacts said liquid photoresist. This advantageously provides a uniformly flat layer of photoresist.

Alternatively, the tool has a lower surface which contacts said liquid photoresist, said lower surface comprising at least one replication section for defining at least one surface structure of the spacer. In particular, by having a complex shape for the tool it is possible to contemporarily imprint the spacer and optical element, or to produce spacers with steps enabling centering of optical structures to be stacked on top of each other, or for other mechanical purposes related to the assembly of the optical structure in a larger system.

In an embodiment, the tool is made from Polydimethyl Siloxane (PDMS).

The first side of the substrate may have an anti-reflective coating.

The central aperture may be circular. In these embodiments, the central aperture may have a diameter of between 1-2 mm.

According to another aspect of the present disclosure there is provided an optical structure comprising: a base structure, the base structure comprising a substrate having an optical element extending from a first side of the substrate; and a spacer formed on the base structure, wherein the spacer comprises a central aperture above the optical element.

The spacer is formed on the base structure by way of the manufacturing process described herein. Therefore no adhesive layer is present between the base structure and the spacer.

The base structure may comprise a yard surrounding the optical element, and the spacer may be formed to cover the yard.

In some implementations the spacer is formed to cover the substrate.

In some implementations the spacer is formed to cover a portion of the optical element.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

Some embodiments of the disclosure will now be described by way of example only and with reference to the accompanying drawings, in which.

DETAILED DESCRIPTION

Embodiments will now be described by way of example only with reference to the accompanying figures.

Figure 1B:
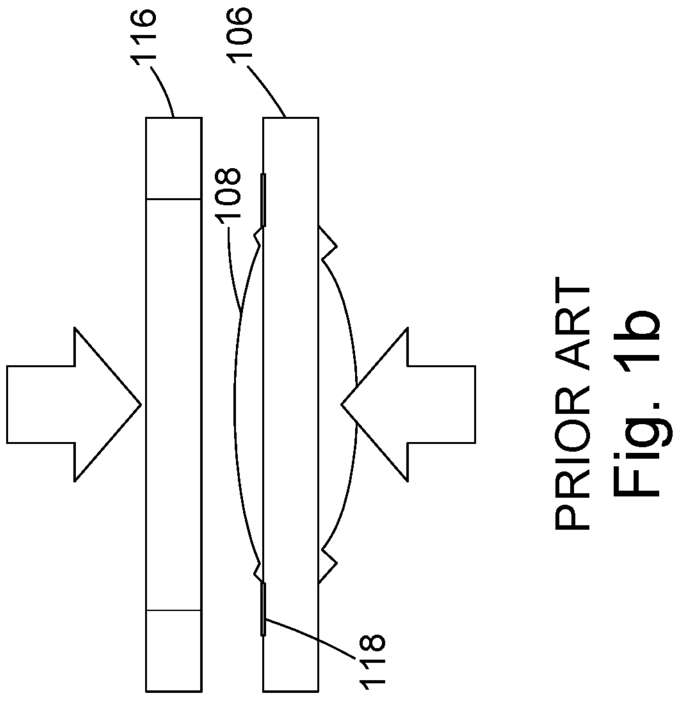
FIG. 1*b* illustrates a known spacer.
Figure 1A:
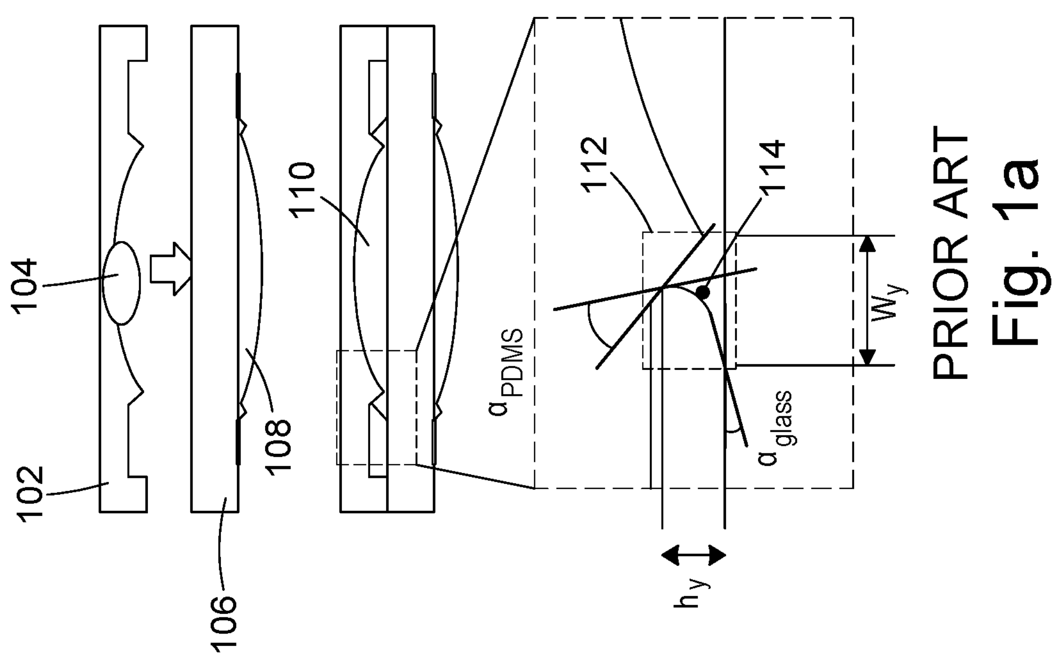
FIG. 1*a* illustrates a known replication process to manufacture an optical element.

FIG. 1*a* illustrates a known replication process to manufacture an optical element showing a cross section through a tool 102 and a substrate 106. A material of the tool 102 may be or include polydimethylsiloxane (PDMS) but other materials may be used. The tool 102 comprises a replication surface comprises one or more replication sections, the surface of each of which is a (negative) copy of a surface shape of an optical element to be manufactured. The replication section(s) can be convex and thus define a concave optical element surface, or be convex and define a concave optical element surface.

The substrate 106 has a first upper side and a second lower side and can be any suitable material, for example glass. FIG. 1*a* illustrates forming an optical element 110 that extends from the first upper side of the substrate 106. As shown in FIG. 1*a* the substrate 106 has an optical element 108 that extends from the second lower side of the substrate 106

For replicating the replication surface of the tool 102, a replication material 104 (e.g. epoxy) is applied to the substrate 106, or the tool 102, or both the tool 102 and the substrate 106.

After application of the replication material 104, the substrate 106 and the tool 102 are aligned with respect to each other. Subsequent to the alignment, the substrate 106 and the tool 102 are brought together. Once the replication material 104 has been hardened the tool 102 is removed.

During replication, excess replication material or epoxy applied during jetting normally overflows the region of interest and forms a yard 112 when the tool 102 and the substrate 106 (e.g., glass) are brought into contact. The yard 112 is typically a circular shape. This circular yard 112 does not perform any optical function, it results from more epoxy 104 being added during the replication process than each structure requires, causing an overflow. The additional epoxy 104 ensures that the complete volume of replication material needed for a particular structure is available (as the tolerance of the epoxy volume is not zero), and the extra fluid pools to form the yard 112. As shown in FIG. 1*a* the yard 112 has an epoxy meniscus 114. Typically the yard 112 has a height $h_y$ of 30-300 μm and a width $w_y$ of 200-400 μm.

As shown in FIG. 1*b* it is known to position a prefabricated glass spacer 116 onto the upper surface of the substrate 106. The glass spacer 116 has a central aperture through which the optical element can extend. The vertical lines shown on the spacer 116 illustrate the differentiation between the circular aperture of the spacer 116 and its walls. Typically, design practice dictates that is necessary to leave some clearance between the inner edge of the central aperture of the spacer and the yard to avoid interference in case of misalignment. Therefore the spacer does not cover the upper surface of the yard 112 neither in the nominal case nor in the worst case misalignment scenario. The glass spacer 116 is mounted to the substrate using an adhesive layer (e.g. glue). As shown in FIG. 1*b*, the substrate 106 may comprise one or more apertures. When the substrate 106 is incorporated into an optoelectronic module comprising an optical sensor, the apertures 118 function to pass light through such that is not incident on the optical sensor to prevent stray light from being incident on the optical sensor.

Figure 2:
FIGS. 2 and 3 illustrates a process for manufacturing an optical structure according to embodiments of the present disclosure.
Figure 2:
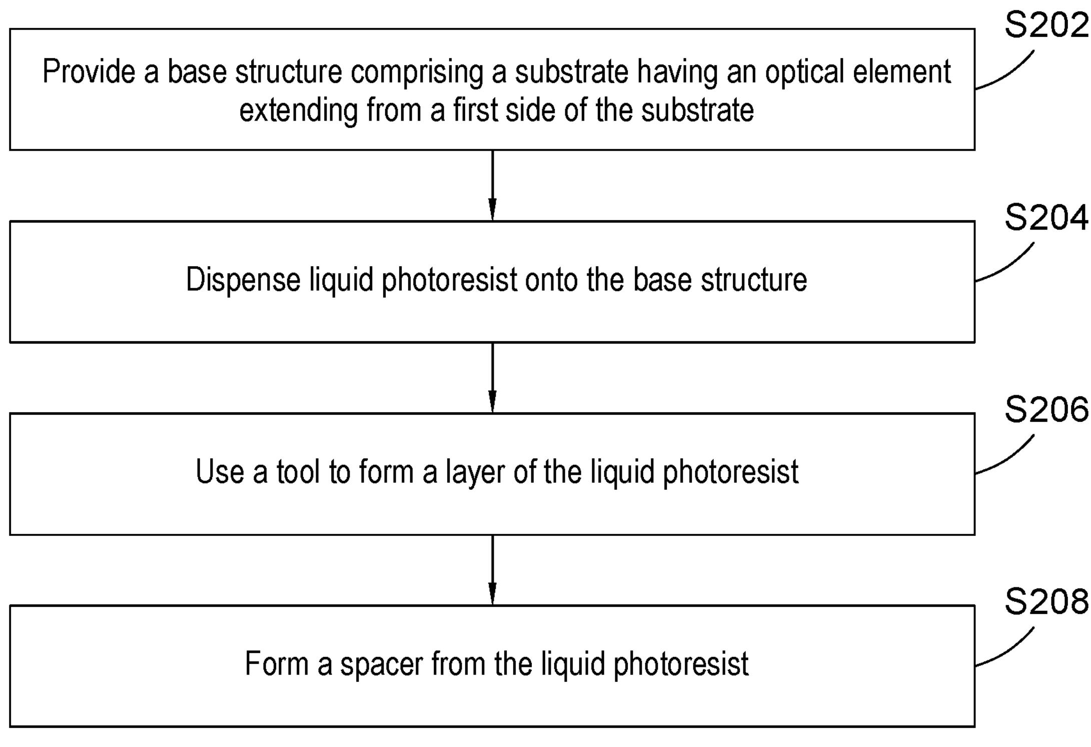
Figure 3:
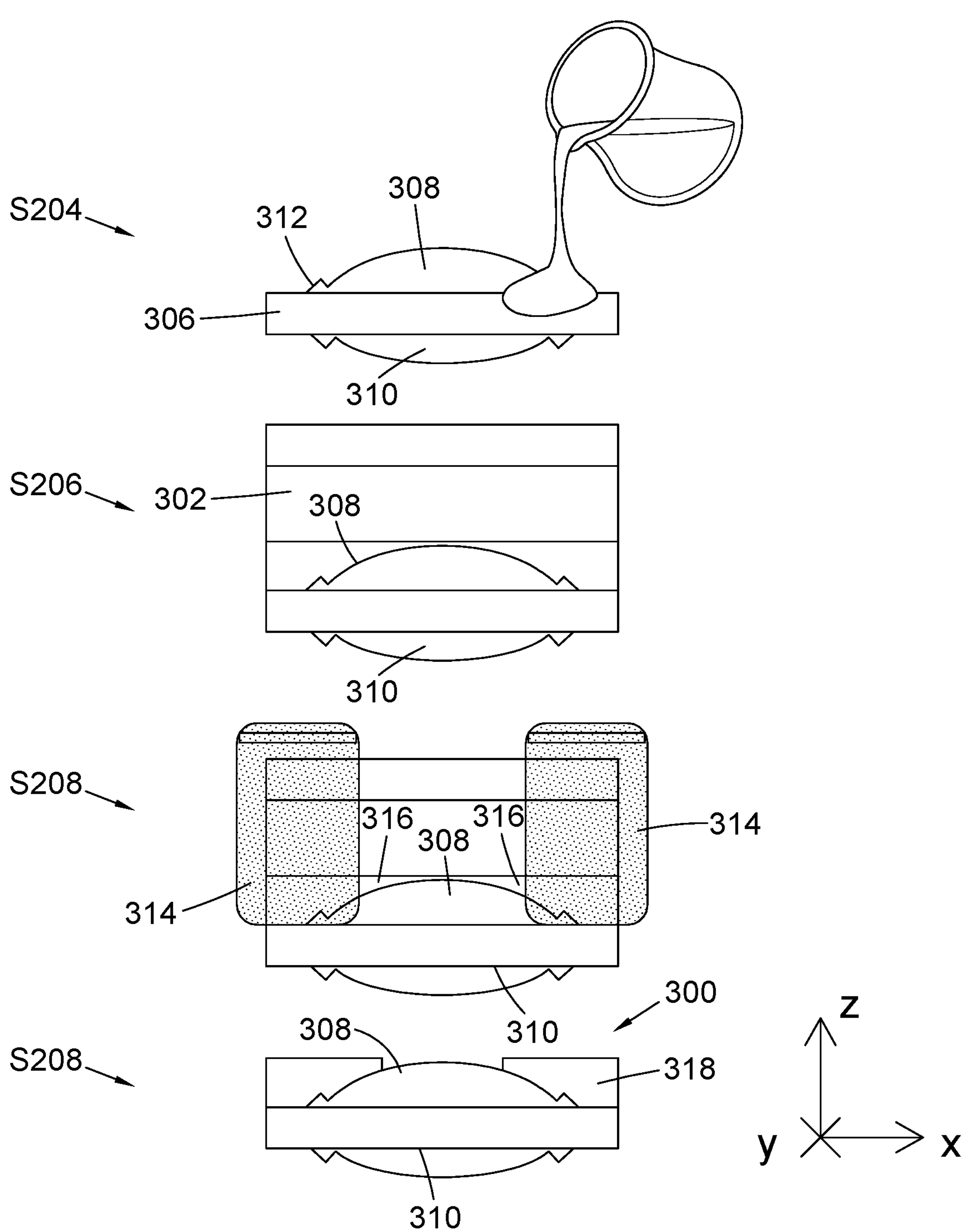

We now refer to FIGS. 2 and 3 which illustrates a process 200 for manufacturing an optical structure 300 according to embodiments of the present disclosure.

As illustrated in FIG. 2, as an initial step S202 a base structure is provided which comprises a substrate 306 having an optical element 308 extending from a first upper side of the substrate 306. The substrate 306 has a first upper side and a second lower side and can be any suitable material, for example glass. The base structure may have been formed from a replication process as described above. The first upper side of the substrate 306 may be coated with an anti-reflection coating.

The optical elements referred to herein may be a lens. It will be appreciated that this is merely an example and the optical element may be any element which influences light that is irradiating them including but not restricted to a lens, collimator, pattern generator, deflector, mirror, beam splitters, diffractive prism, diffuser, micro lens array, elements for decomposing the radiation into its spectral composition, etc., and combinations thereof.

Whilst embodiments are described herein with reference to FIG. 3 which shows an optical element 308 extending from the first upper side of the substrate 306 and a further optical element 310 extending from the second lower side of the substrate 306, this is merely an example. The manufacturing process of an optical structure that is described herein apply to a base structure having a single optical element 308 extending from the first upper side of the substrate 306, and also a base structure having two optical elements extending from the first upper side and the second lower side of the substrate 306 respectively.

Furthermore, whilst embodiments are described herein with reference to FIG. 3 which shows a yard 312 being present on the substrate 306, embodiments also apply to manufacturing an optical structure from a substrate 306 on which a yard 312 is not present.

At step S204, liquid photoresist is dispensed onto the base structure. In particular the liquid photoresist is dispensed onto at least the substrate 306 and the optical element 308. Where a yard 312 is present, the liquid photoresist is also dispensed onto the yard 312.

At step S206, a tool 302 is used to form a layer of the liquid photoresist. In particular the tool is lowered to a height above the substrate 306 which corresponds to a desired height for a spacer 318 (that is to be formed from the liquid photoresist). This ensures accurate control of the height of the spacer 318 (that is to be formed from the liquid photoresist).

The tool 302 may comprise contact spacer portions (not shown in FIG. 3). The contact spacer portions are the structures of the tool 302 that protrude the furthest into the z direction. The contact spacer portions are essentially flat and, thus, are operable to rest against the substrate 306 during step S206, with no material between the contact spacer portions and the substrate 306. The contact spacer portions may, for example, form a ring around the periphery of the lower surface of the tool 302, may comprise a plurality of discrete portions around the periphery, or may comprise a plurality of discrete portions distributed over a large portion of the periphery and/or an interior of the lower surface of the tool 302

A material of the tool 302 may be or include polydimethylsiloxane (PDMS) but other materials may be used. The tool 302 may be provided with a rigid back plate in addition to a softer material portion, which is for example PDMS, whereby this softer material portion is to come into contact with the liquid photoresist. The tool 302 shown in FIG. 3 has a flat lower surface (e.g. of PDMS) which contacts the liquid photoresist. This advantageous when a uniformly flat layer of photoresist is required. In other embodiments, the tool 302 is not flat across the entire lower surface which contacts the liquid photoresist. For example, the lower surface of the tool 302 which contacts the liquid photoresist may comprise at least one replication section for defining at least one surface structure of the spacer.

At step S208, a spacer 318 is formed from the liquid photoresist by exposing a portion of the liquid photoresist to ultraviolet light 314. The tool 302 is transparent to ultraviolet light. Once the spacer 318 is formed this completes the manufacture of the optical structure 300, the tool 302 is then removed. The optical structure 300 shown in FIG. 3 is merely an example, and it will be appreciated from the below that variants to the optical structure 300 shown in FIG. 3 are possible.

In one example, the liquid photoresist that is dispensed onto the base structure at step S204 is negative photoresist. When using negative photoresist, the exposure to ultraviolet light 314 causes the chemical structure of the liquid photoresist to polymerize (harden) and form a spacer 318, as illustrated in FIG. 3. That is, the exposure of ultraviolet light 314 is limited to specific areas of the photoresist which are to form the spacer 318. FIG. 3 illustrates a spacer 318 that is formed to cover the substrate 306, the yard 312 and a portion of the optical element 308, as will be described in more detail below this is just an example and other variants are possible.

When negative photoresist is used, an area above the optical element 308 is unexposed to ultraviolet light to form a central aperture. The remaining unexposed negative photoresist 316 is then removed e.g. by flushing with developer to remove the unexposed negative photoresist leaving the spacer structure intact.

In other examples, the liquid photoresist that is dispensed onto the base structure at step S204 is positive photoresist. When using positive photoresist, ultraviolet light 314 strategically hits areas of the positive photoresist that is intended for removal. The ultraviolet light 314 is incident on at least an area of positive photoresist that is over the optical element to define the central aperture of the spacer. As will be apparent from the spacer variants described below, it will be appreciated that other areas of positive photoresist may additionally be removed by the ultraviolet light 314

The central aperture of the spacer 318 referred to above may be circular in shape, however other shapes are possible. In embodiments whereby the central aperture is circular in shape, the central aperture may have a diameter of between 1-2 mm.

It can be seen from the above, that in the process 200 no adhesive layer is needed which simplifies the manufacturing process.

In the process 200, it may be possible to form electrical contacts through the photoresist.

In embodiments described herein, it is possible to stack multiple wafers one on top of the other and then dice/singulate the wafer into individual assemblies (formed from multiple stacked wafers). In these implementations, dicing lanes may be left with no photoresist following the UV exposure and flush.

We now refer to possible variants of spacers which may be formed using the process 200 described above. In all of these examples, the spacer does not interfere with an active region of the optical element (e.g. a lens).

FIGS. 4*a-d* illustrates spacer variants for embodiments in which the optical structure comprises a yard 312. In FIGS. 4*a-d* the spacer 318 is represented by solid lines.

Figure 4A:
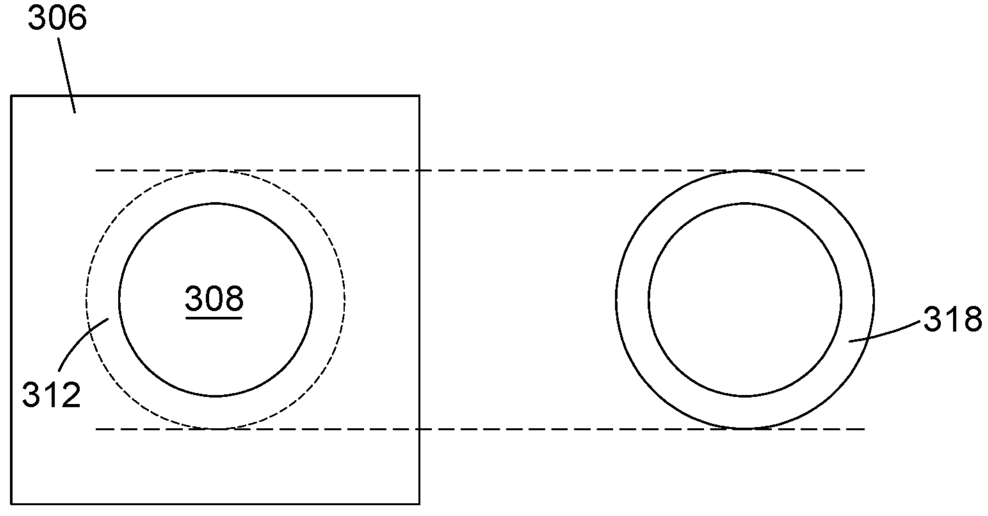
FIGS. 4*a-d* illustrates spacer variants for embodiments in which the optical structure comprises a yard.

FIG. 4*a* illustrates a first spacer variant. In particular, a top view of the substrate 306 is shown in addition to a top view of an example spacer 318 that may be formed by way of the process 200 described above. As shown in FIG. 4*a*, in this example the spacer is formed to cover (e.g. envelope) the yard 312 only by appropriate targeting of the ultraviolet light 314. It will be appreciated that the spacer 318 shown in FIG. 4*a* is ring shaped due to the circular shape of the yard 312, however other shaped yards (and thus spacers) are possible.

Figure 4B:
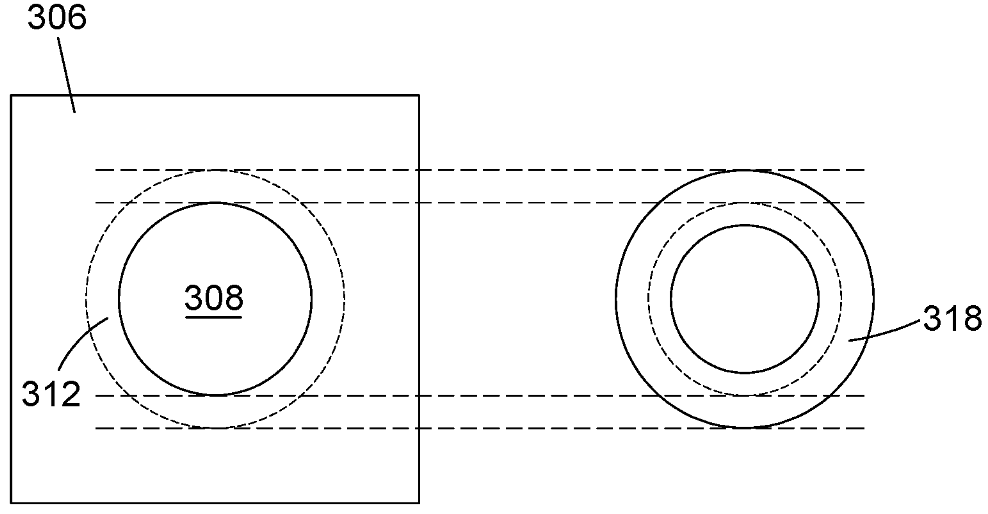

FIG. 4*b* illustrates a second spacer variant. In particular, a top view of the substrate 306 is shown in addition to a top view of an example spacer 318 that may be formed by way of the process 200 described above. As shown in FIG. 4*b*, in this example the spacer is formed to cover (e.g. envelope) a portion of the optical element 308 in addition to the yard 312 by appropriate targeting of the ultraviolet light 314. The portion of the optical element 308 that is covered by the spacer 318 is an outer circumferential portion of the optical element 308. It will be appreciated that the spacer 318 shown in FIG. 4*a* is ring shaped due to the circular shape of the yard 312, however other shaped yards (and thus spacers) are possible.

Figure 4C:
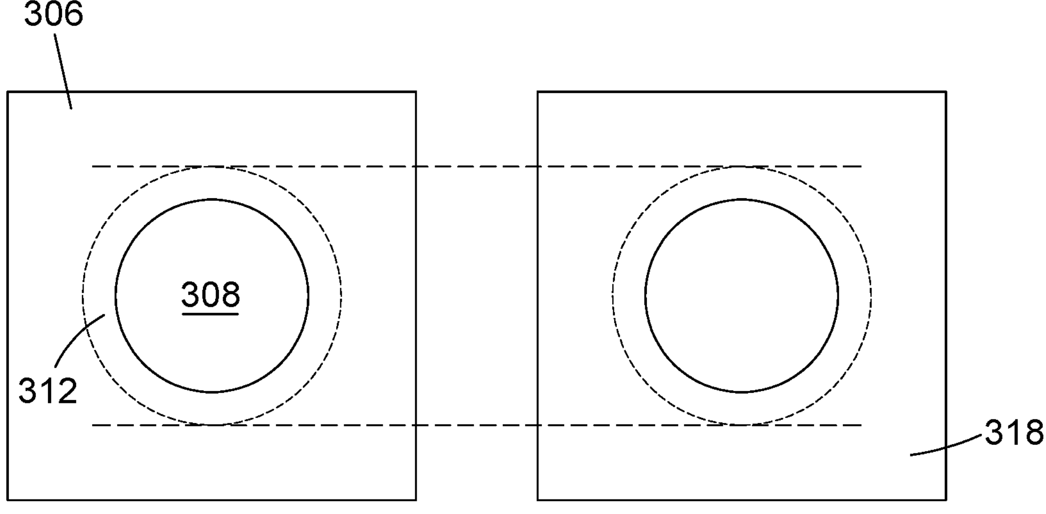

FIG. 4*c* illustrates a third spacer variant. In particular, a top view of the substrate 306 is shown in addition to a top view of an example spacer 318 that may be formed by way of the process 200 described above. As shown in FIG. 4*c*, in this example the spacer is formed to cover (e.g. envelope) the substrate 306 and the yard 312 by appropriate targeting of the ultraviolet light 314.

Figure 4D:
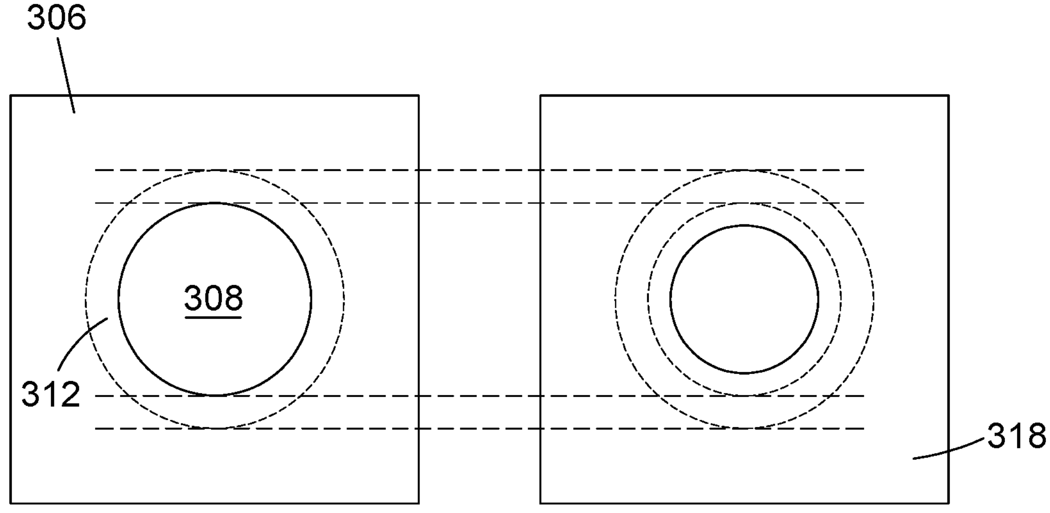

FIG. 4*d* illustrates a fourth spacer variant. In particular, a top view of the substrate 306 is shown in addition to a top view of an example spacer 318 that may be formed by way of the process 200 described above. As shown in FIG. 4*d*, in this example the spacer is formed to cover (e.g. envelope) the substrate 306, the yard 312, and additionally a portion of the optical element 308 by appropriate targeting of the ultraviolet light 314. The portion of the optical element 308 that is covered by the spacer 318 is an outer circumferential portion of the optical element 308. The fourth spacer variant corresponds to that shown in FIG. 3.

In the spacer variants described above, the spacer 318 covers an upper surface of at least the yard 312 and thus can be considered a "yard-eating spacer" because the spacer structure encases the yard 312. In embodiments whereby the spacer is formed to cover at least the yard, the size of the optical structure 300 in the radial direction is advantageously reduced. In particular, when the above described techniques have been used to manufacturing multiple optical structures on a wafer (a substrate) the reduced radial size of each of the optical structures has resulted in a 58% increase in population of optical structures on a wafer thus improving manufacturing efficiency.

Figures 5A, 5B, 5C:
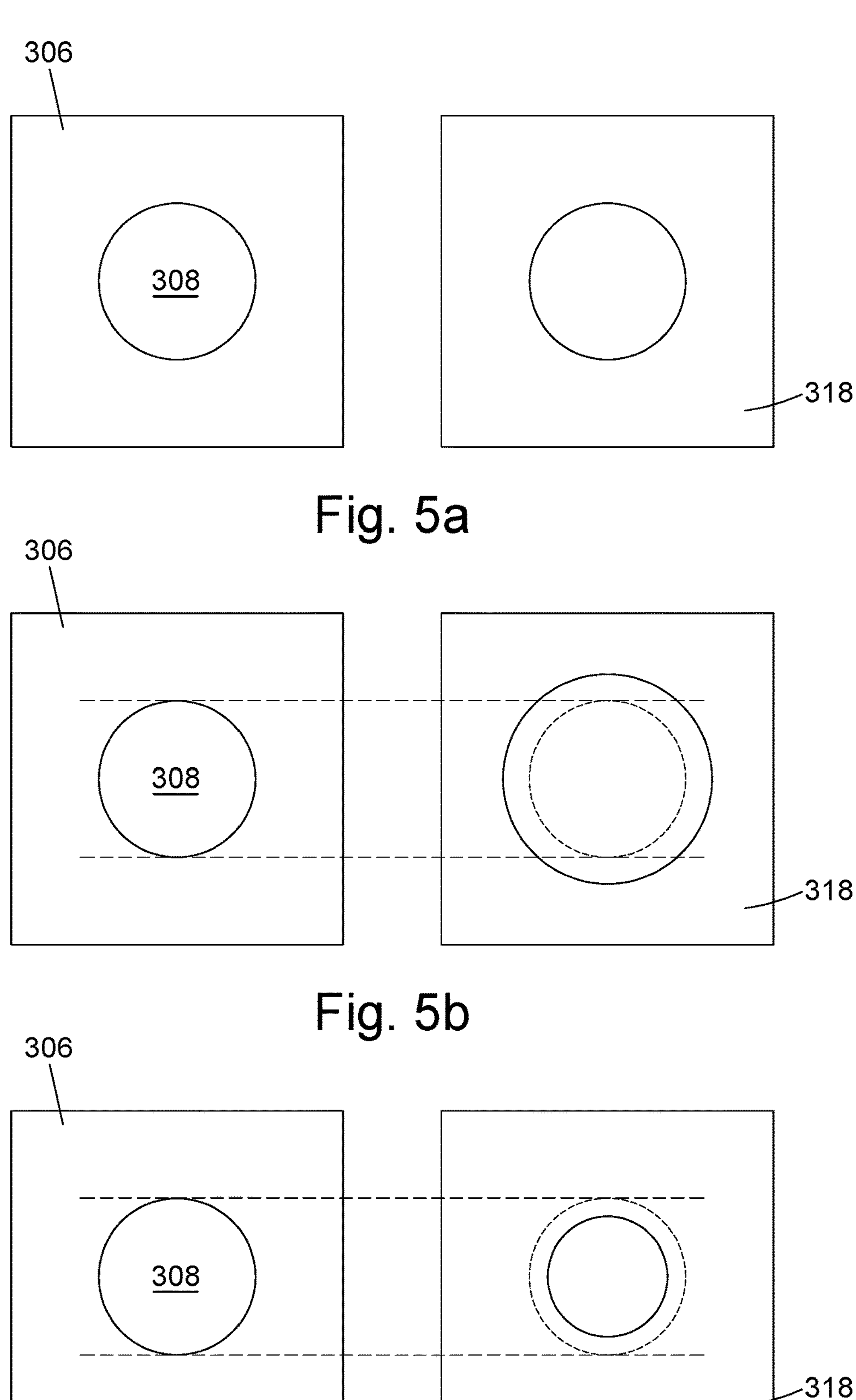
FIGS. 5*a-c* illustrates spacer variants for embodiments in which the optical structure does not comprise yard.

FIGS. 5*a-c* illustrates spacer variants for embodiments in which the optical structure does not comprise a yard 312. In FIGS. 5*a-c* the spacer 318 is represented by solid lines.

FIG. 5*a* illustrates a fifth spacer variant. In particular, a top view of the substrate 306 is shown in addition to a top view of an example spacer 318 that may be formed by way of the process 200 described above. As shown in FIG. 5*a*, in this example the spacer is formed to cover (e.g. envelope) the substrate 306 only by appropriate targeting of the ultraviolet light 314. In this example, the spacer 318 is provided with a central opening through which the optical element 308 can extend. An inner edge of the central opening of the spacer 318 may abut the optical element 308 when the spacer 318 is formed.

FIG. 5*b* illustrates a sixth spacer variant which differs to the fifth spacer variant in that a gap is provided between the inner edge of the central opening of the spacer 318 and the optical element 308 when the spacer 318 is formed.

FIG. 5*c* illustrates a seventh spacer variant. In particular, a top view of the substrate 306 is shown in addition to a top view of an example spacer 318 that may be formed by way of the process 200 described above. As shown in FIG. 5*c*, in this example the spacer is formed to cover (e.g. envelope) a portion of the optical element 308 in addition the substrate 306 by appropriate targeting of the ultraviolet light 314. The portion of the optical element 308 that is covered by the spacer 318 is an outer circumferential portion of the optical element 308. In such embodiments whereby the spacer is formed to cover at least the optical element 308, the size of the optical structure in the radial direction is advantageously reduced.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in any embodiments, whether alone or in any appropriate combination with any other feature disclosed or illustrated herein.

LIST OF REFERENCE NUMERALS

102 tool
104 replication material
106 substrate
108 optical element
110 optical element
112 yard
114 epoxy meniscus
116 spacer
118 aperture
300 optical structure
302 tool
306 substrate
308 optical element
310 optical element
312 yard
314 ultraviolet light
316 unexposed negative photoresist
318 spacer

The invention claimed is:

1. A method of manufacturing an optical structure, wherein the method comprises:
- providing a base structure comprising a substrate having an optical element extending from a first side of the substrate;
- dispensing liquid photoresist onto the base structure to form a layer of said liquid photoresist;
- lowering a tool to a height above said substrate to control a height of said layer,
- wherein the height of said layer is uniform and defined by a contact spacer portion forming a ring around a periphery of a lower surface of the tool,
- wherein the tool comprises the contact spacer portion, and
- wherein the contact spacer portion contacts the base structure to set the uniform height of said layer; and
- exposing a portion of the liquid photoresist to ultraviolet light to form a spacer;
- wherein the spacer comprises a central aperture above the optical element, and
- wherein the spacer has the uniform height defined by the contact spacer portion of the tool.

2. The method according to claim 1, wherein the base structure comprises a yard surrounding the optical element, and the method further comprises dispensing the liquid photoresist onto the yard.

3. The method according to claim 2, wherein the spacer is formed to cover the yard.

4. The method according to claim 1, further comprising dispensing the liquid photoresist onto a portion of the optical element, and wherein the spacer is formed to cover said portion of the optical element.

5. The method according to claim 1, further comprising dispensing the liquid photoresist onto the substrate, and wherein the spacer is formed to cover the substrate.

6. The method according to claim 1, wherein the liquid photoresist is a negative photoresist, and wherein the forming said spacer comprises:

exposing ultraviolet light to only said portion of the liquid photoresist to harden the photoresist, wherein an area above the optical element is unexposed to ultraviolet light to form the central aperture; and removing a remaining unexposed negative photoresist.

7. The method according to claim 1, wherein the liquid photoresist is a positive photoresist, and wherein the forming said spacer comprises exposing ultraviolet light to at least an area over said optical element to define the central aperture of the spacer.

8. The method according to claim 1, wherein the tool has a flat lower surface which contacts said liquid photoresist.

9. The method according to claim 1, wherein the tool has a lower surface which contacts said liquid photoresist, said lower surface comprising at least one replication section for defining at least one surface structure of the spacer.

10. The method according to claim 1, wherein the tool comprises Polydimethyl Siloxane (PDMS).

11. The method according to claim 1, wherein the first side of the substrate has an anti-reflective coating.

12. The method according to claim 1, wherein the central aperture is circular.

13. The method according to claim 12, wherein the central aperture has a diameter ranging from 1 to 2 mm.

14. The method according to claim 1, wherein the liquid photoresist comprises a material that is opaque to a wavelength of interest.

15. An optical structure comprising:

a base structure comprising:

a substrate having an optical element extending from a first side of the substrate; and a yard surrounding the optical element; and a spacer formed of a photoresist material uniformly on the base structure, wherein the spacer comprises a central aperture above the optical element, wherein the spacer covers the yard and a portion of the optical element, and wherein a height of the spacer is defined by a uniform height set by a contact spacer portion of a tool used during manufacturing, the contact spacer portion forming a ring around a periphery of a lower surface of the tool.

16. The optical structure according to claim 15, wherein the spacer covers the substrate.

17. The optical structure according to claim 15, wherein the portion of the optical element covered by the spacer is an outer circumferential portion of the optical element.

* * * * *